(12) United States Patent
Plunk et al.

(10) Patent No.: US 9,163,814 B2
(45) Date of Patent: Oct. 20, 2015

(54) INTEGRAL TROFFER MOTION DETECTOR

(75) Inventors: Carlton Plunk, Saltillo, MS (US);
Eugene Graff, Tupelo, MS (US)

(73) Assignee: KONINKLIJKE PHILIPS N.V.,
Eindhoven (NL)

(*) Notice: Subject to any disclaimer, the term of this patent is extended or adjusted under 35 U.S.C. 154(b) by 215 days.

(21) Appl. No.: 13/880,069

(22) PCT Filed: Oct. 12, 2011

(86) PCT No.: PCT/IB2011/054494
§ 371 (c)(1),
(2), (4) Date: Apr. 18, 2013

(87) PCT Pub. No.: WO2012/052879
PCT Pub. Date: Apr. 26, 2012

(65) Prior Publication Data
US 2013/0207552 A1 Aug. 15, 2013

Related U.S. Application Data

(60) Provisional application No. 61/405,688, filed on Oct. 22, 2010.

(51) Int. Cl.
F21V 23/00 (2015.01)
F21S 8/02 (2006.01)
F21S 8/04 (2006.01)
F21V 23/04 (2006.01)
H05B 37/02 (2006.01)

(52) U.S. Cl.
CPC ............... *F21V 23/008* (2013.01); *F21S 8/02* (2013.01); *F21S 8/026* (2013.01); *F21S 8/04* (2013.01); *F21V 23/0442* (2013.01); *H05B 37/0209* (2013.01)

(58) Field of Classification Search
CPC ............. H05B 33/0869; H05B 37/00; H05B 37/0209; F21V 23/0442; F21V 213/00; F21V 23/008; G05B 11/017; G09G 1/04; H04N 3/18; H04N 5/126; F21S 8/00; F21S 8/02; F21S 8/026; F21S 8/04
USPC ........................................................ 315/152
See application file for complete search history.

(56) References Cited

U.S. PATENT DOCUMENTS

| 6,091,200 A | 7/2000 | Lenz | |
|---|---|---|---|
| 7,934,854 B2* | 5/2011 | Anglikowski et al. | 362/269 |
| 2009/0009989 A1 | 1/2009 | Verfuerth et al. | |
| 2009/0141499 A1* | 6/2009 | Fabbri et al. | 362/276 |

FOREIGN PATENT DOCUMENTS

WO 2010116200 A1 10/2010

* cited by examiner

*Primary Examiner* — Lincoln Donovan
*Assistant Examiner* — David Mattison

(57) ABSTRACT

A sensor system (20) electrically connected to and controlling at least one recessed luminaire (30). The sensor system housing (22) is externally connected to the luminaire (30) and includes a flexible member (50) projecting therefrom. The flexible member (50) supports detection electronics spaced from the sensor system housing (22) or the coupled light fixture and sensor system housings (32, 22). The flexible member (50) allows a sensor (52) to be horizontally and vertically positioned relative to the sensor system housing (22).

18 Claims, 8 Drawing Sheets

INTEGRAL TROFFER MOTION DETECTOR

TECHNICAL FIELD

The present invention relates to a sensor system for recessed lighting systems and particularly to a sensor system integral with the recessed lighting fixture having a remotely positionable sensor.

BACKGROUND

Many sensing systems are remotely positioned away from the recessed lighting system, internally positioned within the recessed lighting system, or not particularly suited for the recessed environment. Thus, there is a need in the art for a sensing system directly affixed to the light fixture housing allowing placement of the sensor electronics in an adjacent space.

SUMMARY

The present embodiment is directed to methods and apparatuses for an integral sensor system with an adjustable member allowing the detection electronics to be spaced from the light fixture. This allows mounting of the sensor system to a variety of luminaires with varying structure and the entire sensor system no longer has to be remotely mounted away from the light fixture.

Generally, in another aspect, the sensor system is external to the light fixture. Further, the installer can easily make a preexisting fixture system a controlled fixture with the sensor system.

In a further aspect, the present system includes a sensing system for control of at least one recessed light fixture comprising a sensing system including a housing with an elongated adjustable member having a first end and a distal end, the first end of the adjustable member coupled to the housing and the distal end of the adjustable member includes one or more sensor. The system further includes at least one recessed light fixture having a sensor system housing, the sensing system housing exteriorly coupled to said light fixture housing. In various aspects described, the one or more sensors of the system are in direct communication with the at least one recessed light fixture and the distal end of the adjustable member is repositionable relative to the sensing system housing thereby allowing the sensors to be positioned in a variety of spaced locations from the sensing system housing. In some embodiments, the distal end of the adjustable member can be vertically or horizontally repositioned relative to the sensing system housing. In other aspects and embodiments, the distal end of the adjustable member can releasably engage an adjacent ceiling surface within which the light fixture is recessed. Still further embodiments can include a flexible tube allowing for ready and easy installation while also allowing for adjustment and manipulation thereof. In still other aspects, the sensing system housing may be releasably connected to the light fixture by an electrical connector. Lastly, other various embodiments may include a detachable sensor protector which has a cutting tool for cutting the correct opening for insertion of said distal end sensor into the adjacent ceiling within which the light fixture housing is recessed.

All of the above outlined advantages are to be understood as exemplary only and many more objectives of the embodiments may be gleaned from the disclosure herein. Therefore, no limiting interpretation of the objectives noted are to be understood without further reading of the entire specification, claims, and drawings included herewith.

DETAILED DESCRIPTION

In the following detailed description, for purposes of explanation and not limitation, representative embodiments disclosing specific details are set forth in order to provide a thorough understanding of the claimed invention. However, it will be apparent to one having ordinary skill in the art having had the benefit of the present disclosure that other embodiments according to the present teachings that depart from the specific details disclosed herein remain within the scope of the appended claims. Moreover, descriptions of well-known apparatuses and methods may be omitted so as to not obscure the description of the representative embodiments. Such methods and apparatuses are clearly within the scope of the claimed invention. For example, various embodiments of the apparatus disclosed herein are particularly suited for use in conjunction with a recessed lighting fixture having a plurality of fluorescents for implementation in a fluorescent-based lighting unit. Accordingly, for illustrative purposes, the claimed invention is discussed in conjunction with such a lighting unit. However, other configurations of the apparatus, such as but not limited to LEDs and CFLs, and applications, such as but not limited to track lighting, are contemplated without deviating from the scope or spirit of the claimed invention.

Various types of lighting and luminaire controls are desirable as a means for controlling the amount of light as well as the amount of energy used by the lighting system during various installed environments. A number of various sensors and controlling electronics may be utilized such as motion sensors, light sensors, dimming electronic controls and other known electronic control devices, all of which may be integrated with lighting systems and luminaires. It is desirable to incorporate an add-on and integral sensor system allowing for the mounting of a variety of available spaced sensors for control of recessed luminaires. Sensors are selectable to respond to multiple environmental circumstances in order to reduce the amount of light produced by the luminaire, control or reduce the amount of electricity utilized by the luminaire, or activate/deactivate the luminaire or lighting system. Such sensor systems are highly desirable and should necessarily be easy to install and incorporate with existing luminaire and ceiling constructions, both from the standpoint of wiring as well as interfacing with the ceiling and the luminaire control circuitry. Many characteristics may also be required and implemented herein, such as modularity, simple construction, easy installation and integration with a lighting system, as well as electronic controls contained within the sensor system for electrically connecting and controlling the coupled recessed luminaire(s).

Figure 8:
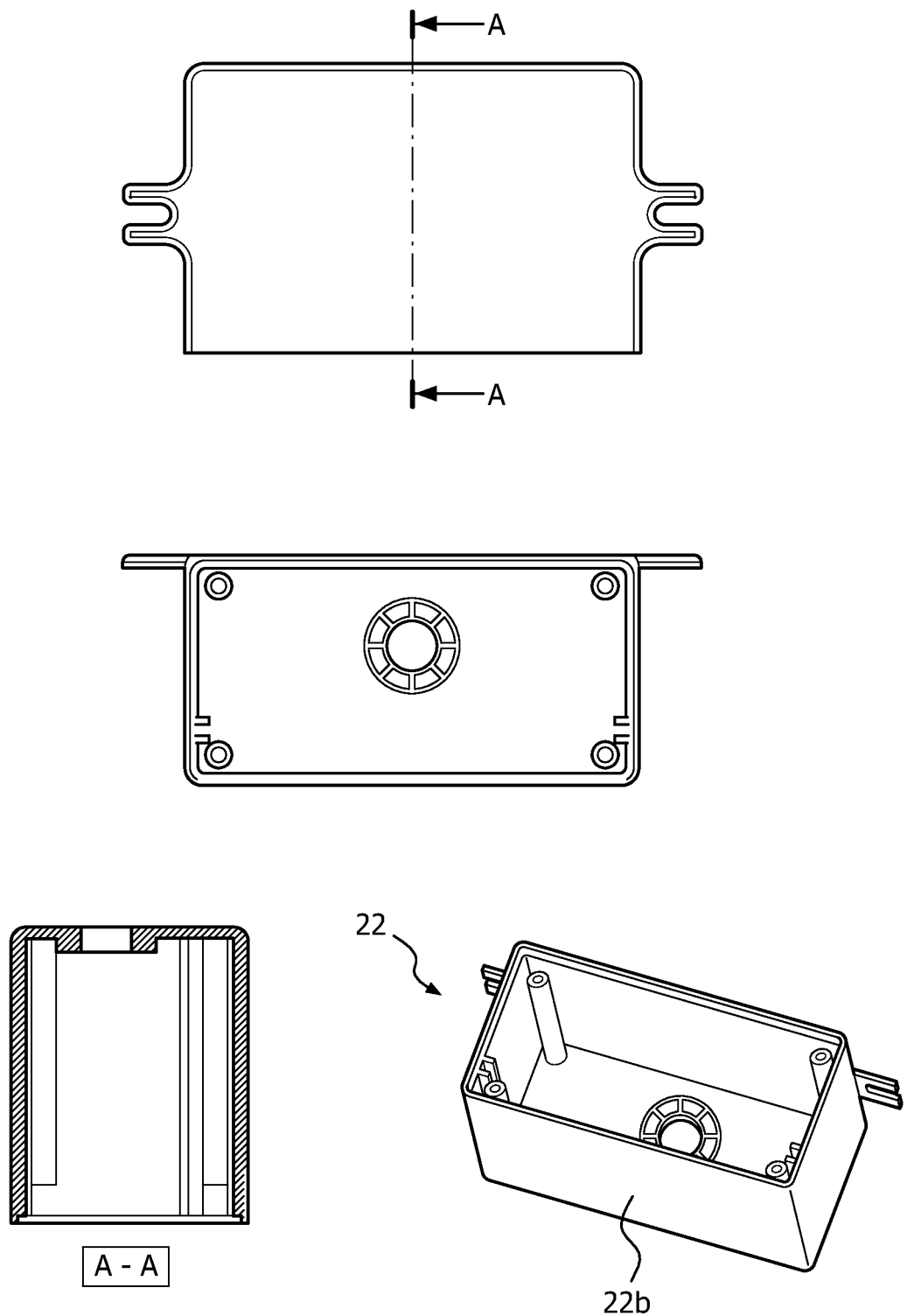
FIG. 8 are multiple views a sensor housing embodiment of FIG. 2 with the sensor housing cover removed.
Figure 9:
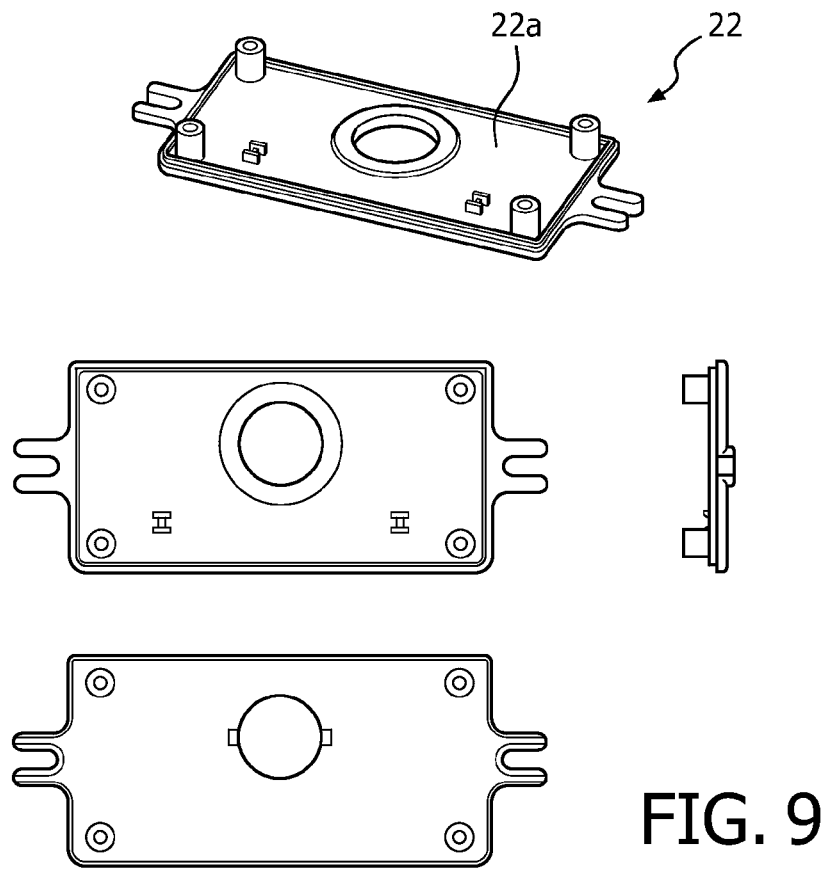
FIG. 9 are multiple views of the sensor housing cover embodiment of FIG. 2.
Figure 10:
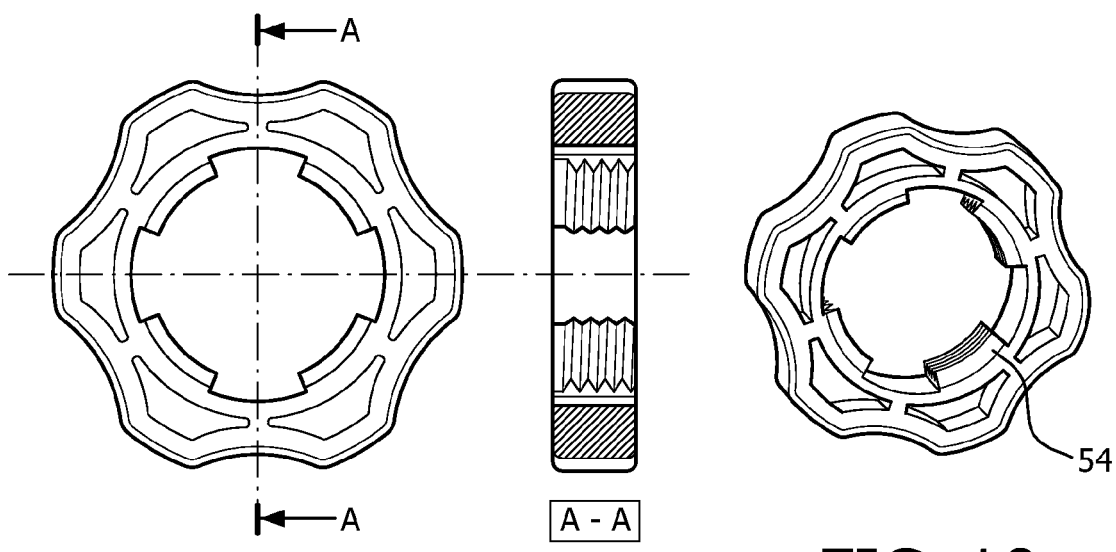
FIG. 10 are multiple views of the threadable flange embodiment of FIG. 2.
Figure 11:
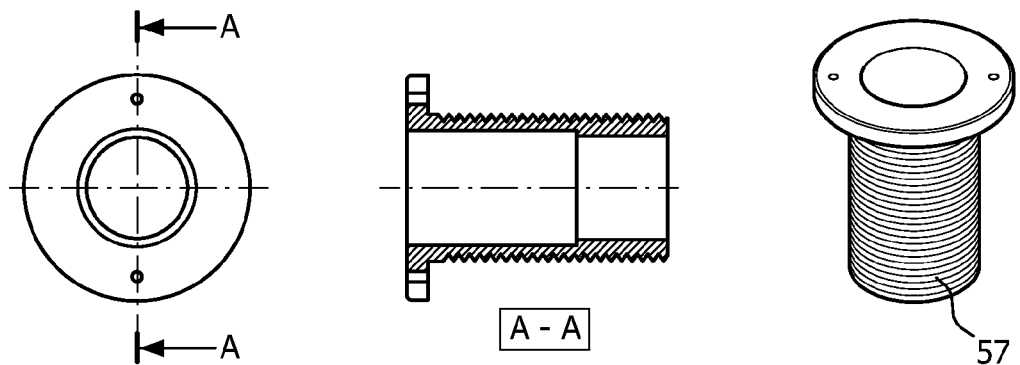
FIG. 11 are multiple views of the lens tube embodiment of FIG. 2.
Figure 12:
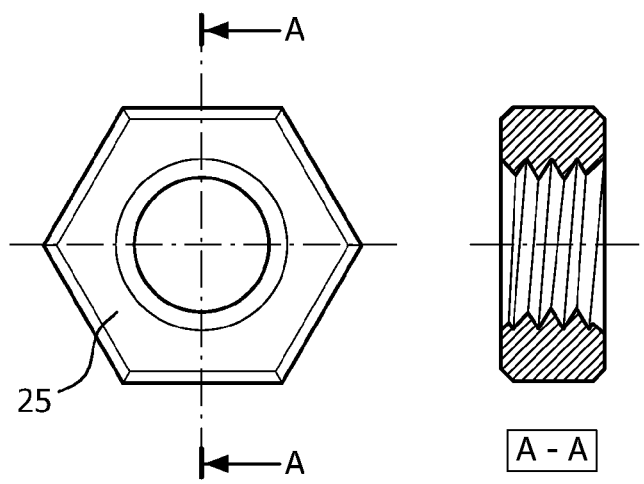
FIG. 12 are multiple views of the nut fastener embodiment of FIG. 2.
Figure 13:
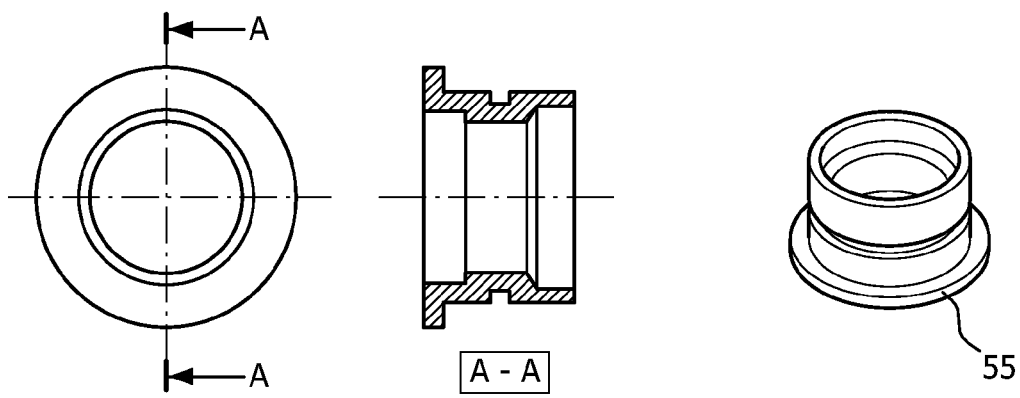
FIG. 13 are multiple views of the lens seat embodiment of FIG. 2.

As illustrated in FIGS. 1-13, a sensor system 20 of the present invention is depicted as disclosed and is electronically configured to control a recessed luminaire 30, potentially in a ceiling system 10 as is shown. Sensor system 20 is a separate control system for controlling a multitude of luminaires and recessed lighting systems. Sensor system 20 may be integrated with pre-existing or pre-installed recessed luminaires or may be installed initially in order to control one or more recessed luminaires 30. Sensor system 20, as is depicted and disclosed herein, may generally incorporate control of a plurality of luminaires as required such that entire banks of luminaires may be effected by the sensor system 20 in order to effect the desired characteristic and measured environmental condition. Sensor system 20 can contain any variety of sensors to control the light output of recessed luminaire 30 including, but not limiting to, motion sensing, light intensity sensing or other environmental characteristics as measured by the sensor 12. Sensor system 20 for the recessed luminaire of the present invention may be a stand-alone, modular, add-on product which is designed to interface with a variety of recessed luminaires and which is directly affixed to the target recessed luminaire, as depicted in FIG. 3. It is further desirable that sensor system 20 provide a housing or side car box 22 which externally attaches to the exterior of the light fixture as is depicted. Housing 22 may include a cover 22a (FIG. 9) coupled to a receptacle 22b (FIG. 8) that may be separable or non-separable therefrom, for example a hinged connection may allow pivoting of the cover.

As is commonly understood and known in the art, t-bar support grids 12 as depicted, are utilized to support ceiling tiles 14 and other luminaires and recessed luminaire systems 30 as are shown. These common place t-bar support grids 12 typically provide openings of various desired widths and are utilized to support air vents, luminaires, and other systems. As is depicted herein, for installation of the sensor system 20 for a recessed lighting system 30, the sensor system 20 may be recessed and attached directly to a pre-existing recessed lighting system and placed in electrical connectivity and control of a recessed luminaire 30, in this example a fluorescent troffer luminaire supported in the ceiling. Further, the entire sensor system housing 22 may be directly and externally affixed to the pre-existing luminaire housing or already be preassembled with the luminaire housing.

Figure 2:
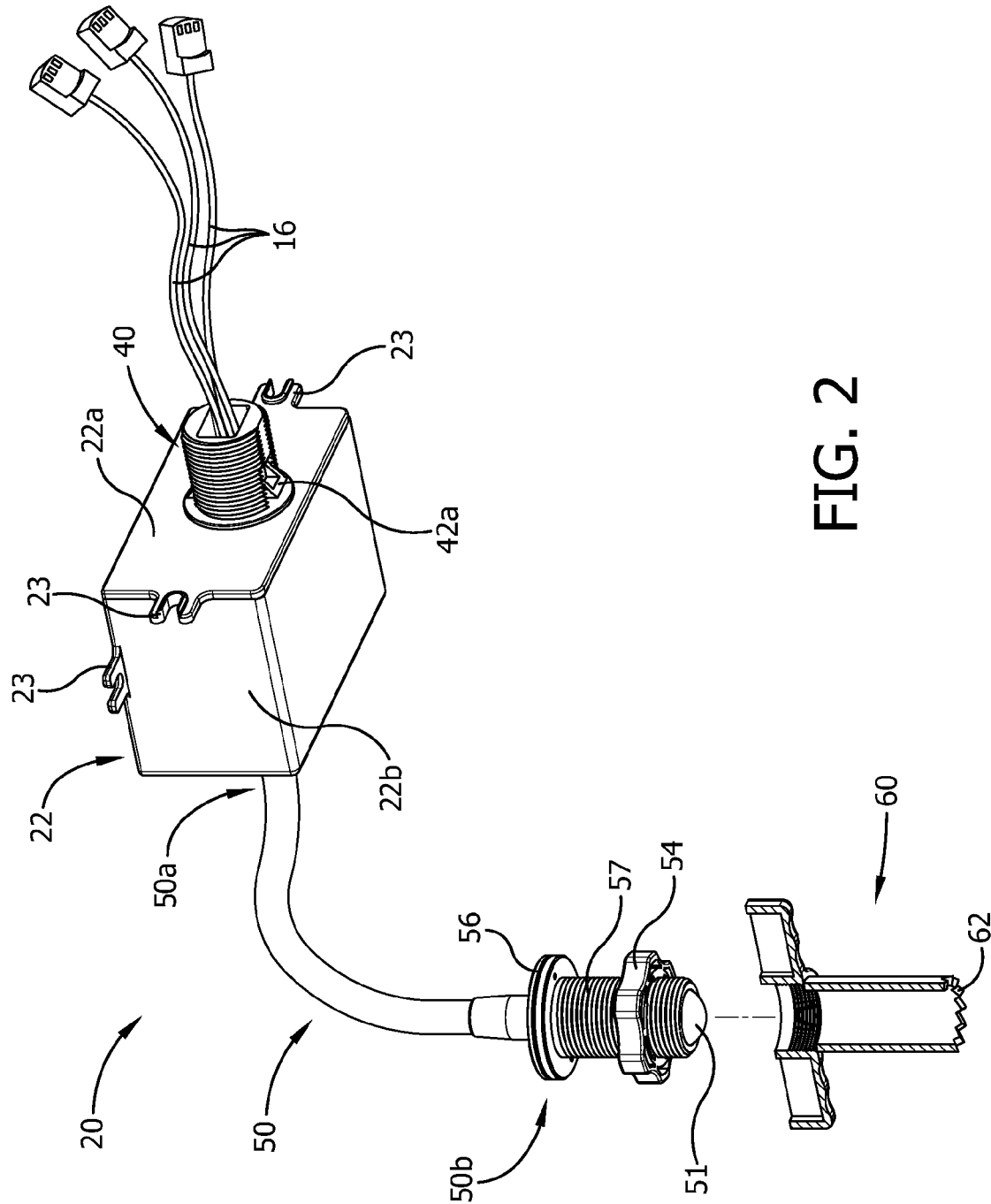
FIG. 2 is a bottom perspective view of the sensor system of FIG. 1 with portions of the drill attachment partially broken away.
Figure 3:
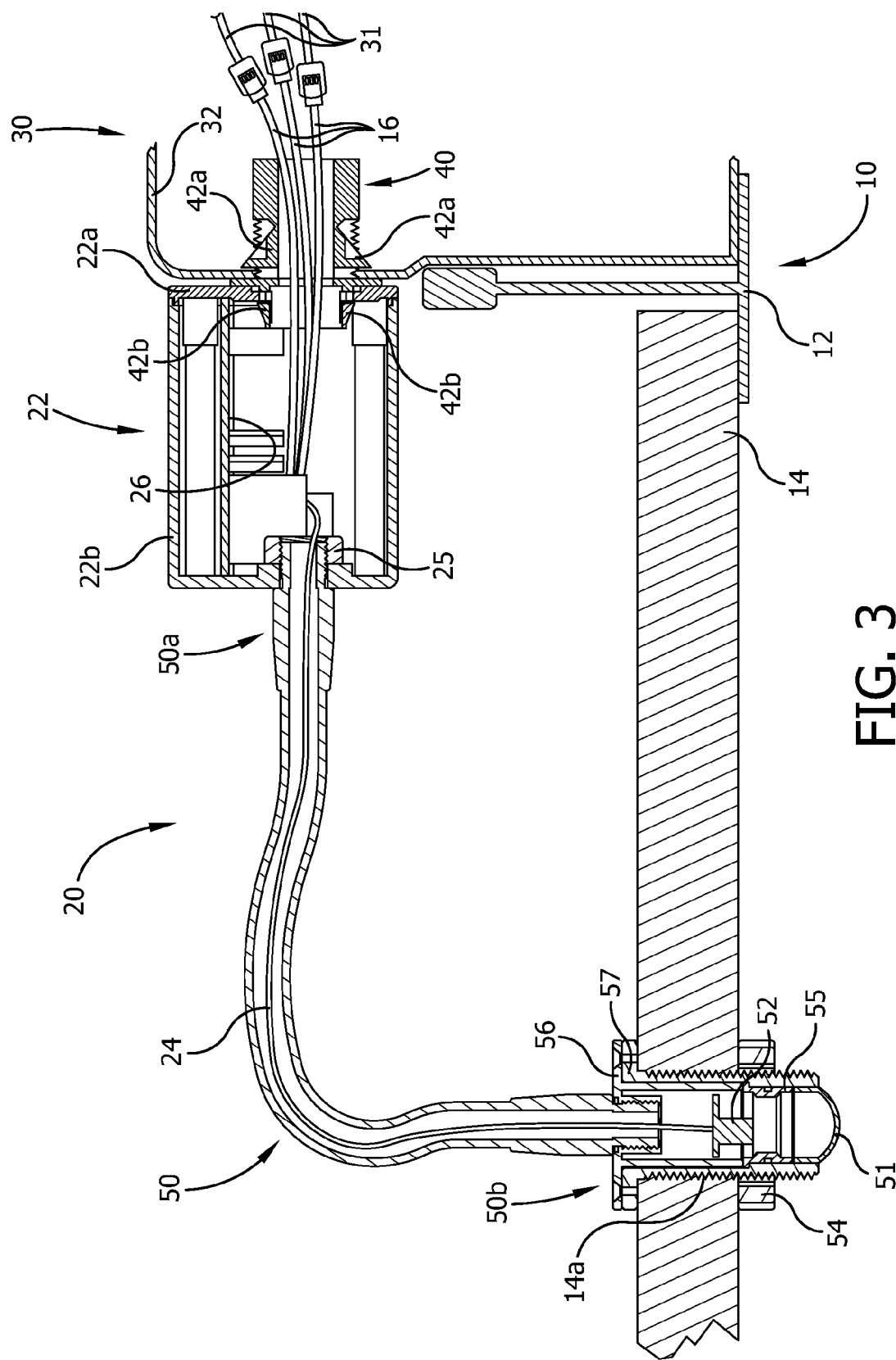
FIG. 3 is an enlarged sectional view of the sensor system and recessed lighting system of FIG. 1 taken along line 3-3.
Figure 4:
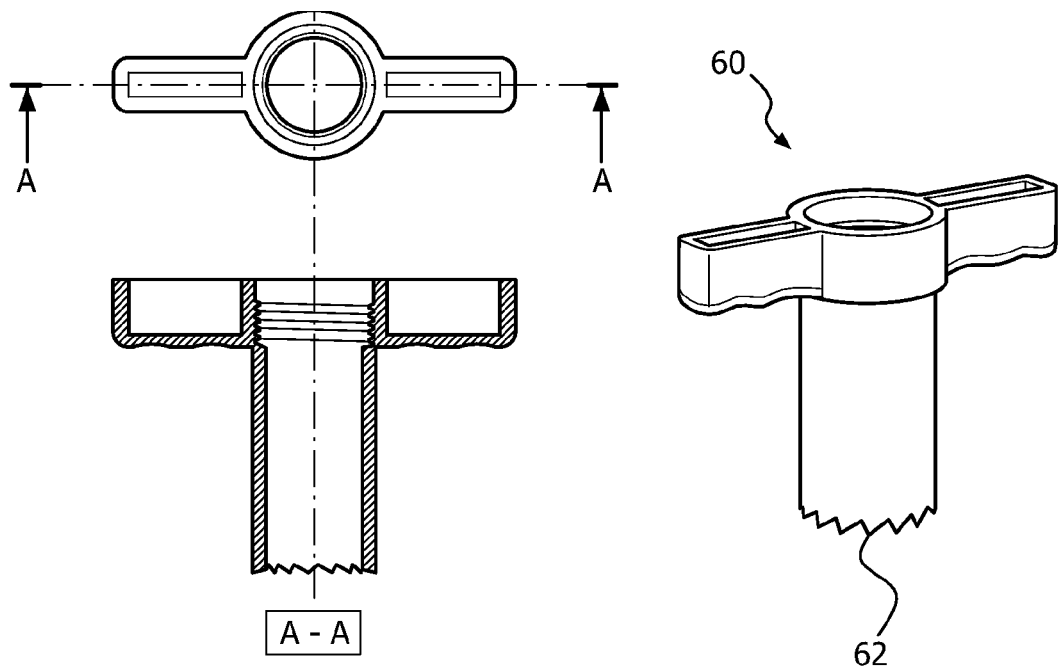
FIG. 4 are multiple views of the drill attachment embodiment of FIG. 2.
Figure 5:
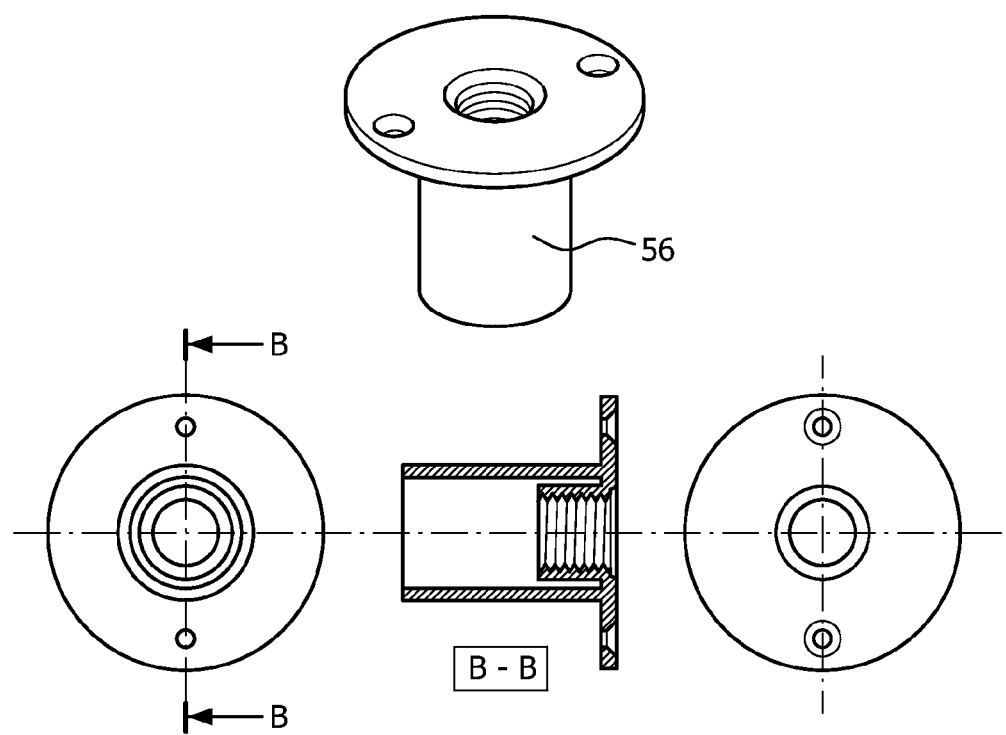
FIG. 5 are multiple views of the flexible member extension embodiment of FIG. 2.
Figure 6:
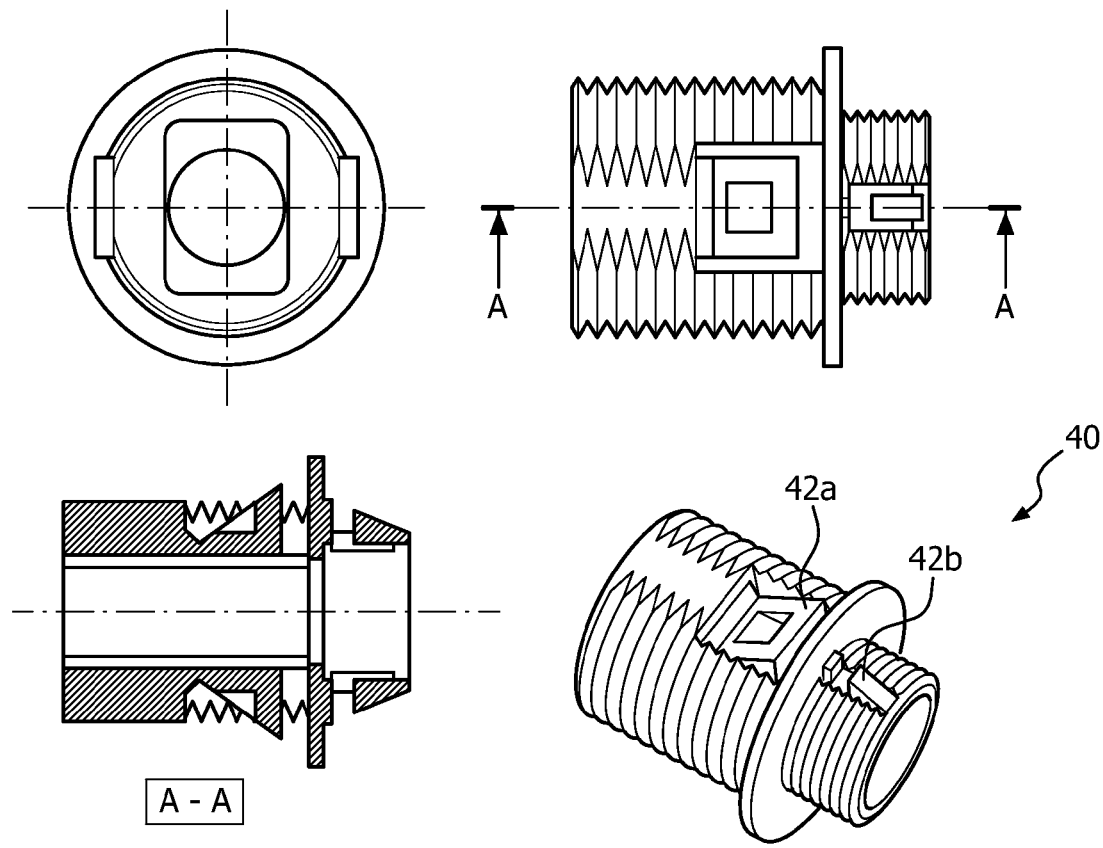
FIG. 6 are multiple views of the connector embodiment of FIG. 2.
Figure 7:
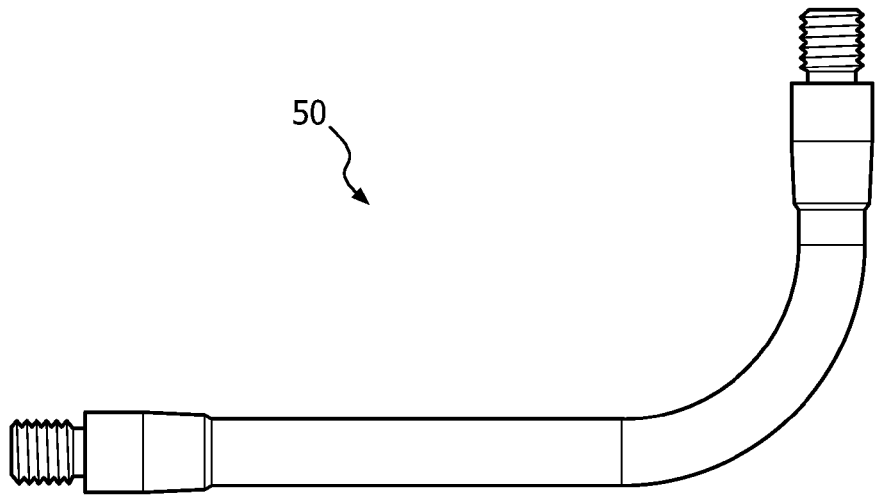
FIG. 7 is a side view of the flexible member embodiment of FIG. 2.

As illustrated in FIGS. 2 and 3, in use sensor housing 22 may be directly fixed to light fixture housing 32, releasably or permanently, by using a connector 40, quick release mechanism, or other attachment means. Connector 40 (FIG. 6) may be inserted into an existing knock out of light fixture housing 32 thereby coupling the light fixture housing 32 to the sensor housing 22. Wiring 16 through the connector electrically and controllingly connects sensor system 20 to the recessed luminaire 30. Connector 40 may be snapped into a secured position (FIG. 3) with one or more bias retention arms 42a and 42b as shown or possibly a threaded lock nut may be used. Connector 40 may have releasable connections at either end for one or each one of the sensor housing 22 or the light fixture housing 32, with the possibility of the other connector end being a permanent connection. A variety of other or additional attachment mechanisms may be used to secure sensor housing 22 to the light fixture 30, including permanent or releasable mechanisms, that may or may not allow for electrical connections therethrough. For example, one or more tabs 23 used in combination with TEK screws may be used for the engagement.

An aperture 14a or various other holes, as shown in FIG. 3, may be formed in ceiling tile 14 or other material/surface with use of a drill attachment 60 or other device for exposing the distal end 50b of a flexible member or tube 50 (FIG. 7) with sensor 52 or other detection electronics therethrough. The drill attachment or detachable sensor protector 60 (FIGS. 2 and 4) may be threaded over the lens 51 or lens assembly of the flexible tube distal end 50b to protect the lens during shipment. Drill attachment 60 is removed from distal end 50b and then can be used to aid in creating the aperture 14a in ceiling tile 14 or other material for the lens assembly. Drill attachment 60 includes a cutting tool or more specifically a plurality of teeth 62 at its distal end. This provides the installer with the correct size opening required to fit the flexible member extension 56 (FIG. 5), lens tube 57 (FIG. 11), and a threadable flange or knob 54 (FIG. 10) provided on the lens assembly. Lens 51 and sensor/collector 52 will be mounted in the lens assembly or distal end 50b of the flexible tube. A lens seat 55 (FIG. 13) within lens tube 57 may also be used to position lens 51 within the assembly. The wiring or low voltage wiring 24 from sensor 52 to the sensor housing 22 will be fully or partially surrounded by the flexible tube 50 and may terminate in the housing. The flexible tube may be horizontally and vertically adjusted to the location of the aperture or various other holes in the ceiling tile or material spaced from the light fixture and then inserted therethrough. Thus, flexible tube 50 allows the placement of the attached sensor 52 to be modified or installed in a variety of spaced positions relative to either the sensor housing or luminaire housing. When the sensor 52 at the distal end 50b of the flexible tube 50 is in position through the ceiling tile 14, threadable flange 54 is assembled thereto and exposed on a lower surface of the ceiling tile in order to properly finish and provide a clean appearance to the exposed ceiling tile. Further, the flexible tube 50 allows for various light fixture designs to be used by allowing the tube to adjust the vertical and horizontal position of the sensor 52. For instance, sensor housing 22 and tube 50 may be externally affixed to a variety of fixtures, for example having different troffer depths, and still allows adjustment within the recessed environment conditions to properly place the sensor into its spaced position relative to either the sensor housing or luminaire housing.

As shown in FIG. 3, flexible tube 50 allows for placement of the lens and/or sensor in an adjacent ceiling area or spaced area. The lens 51 may have, but is not limited to, a 10 foot radius with 180 degree viewing angle, cone of 120 degrees. The proximate end 50a of flexible tube 50 is shown as being positioned opposite connector 40 that couples sensor housing 22 and light fixture 30, although other positions are contemplated. Proximate end 50a of flexible tube 50 is secured to the sensor housing by a nut fastener 25 (FIG. 12) and contains wiring 24 from the sensor 52 therethrough. It is understood that tubing 50 may terminate into sensor housing 22 by adhesives or mechanical fasteners. Further, flexible tube 50 may be flexible/bendable by either a tool free means or with tools and may also hold its shape once flexed or bent into its desired position for its application. Thus, tube 50 may have sufficient rigidity or other characteristics that allow it to maintain its repositioned shape. The flexible member or tube may be a variety of different lengths, size, construction, and material such as metal, including but not limited to aluminum, or plastics. The flexible tube 50, lens 51, connector 40, housing 22, or other portions of the sensor system 20 may contain gaskets, seals, or other structure to prevent unwanted moisture and dust from entering the device. Also, it is understood that one or more apertures or other mechanical structures may be used to vent, cool, or provide air flow into and/or out of the sensor system 20.

Integrated with sensor system 20 may be a sensor control line 16 which may be provided with a number of attachments for electrical control and connectivity to the recessed luminaire 30. As is shown in FIG. 3, the removable and pluggable connections may be utilized in order to electrically and controllingly connect sensor system 20 to the recessed luminaire 30 such that the connectors may exit either the housing 22 or the luminaire housing 32 for the recessed luminaire 30 and exit thereby without having to entirely open the module itself. The sensor control line 16 may be readily configurable to any desirable configuration to connect to a recessed luminaire control line 31 as is shown as long as the sensor system 20 of the present invention is placed in electrical and control connectivity with the luminaire 30. Various known sensor control lines and connectors are available for use and integration with the sensor system 20 depicted.

Figure 1:
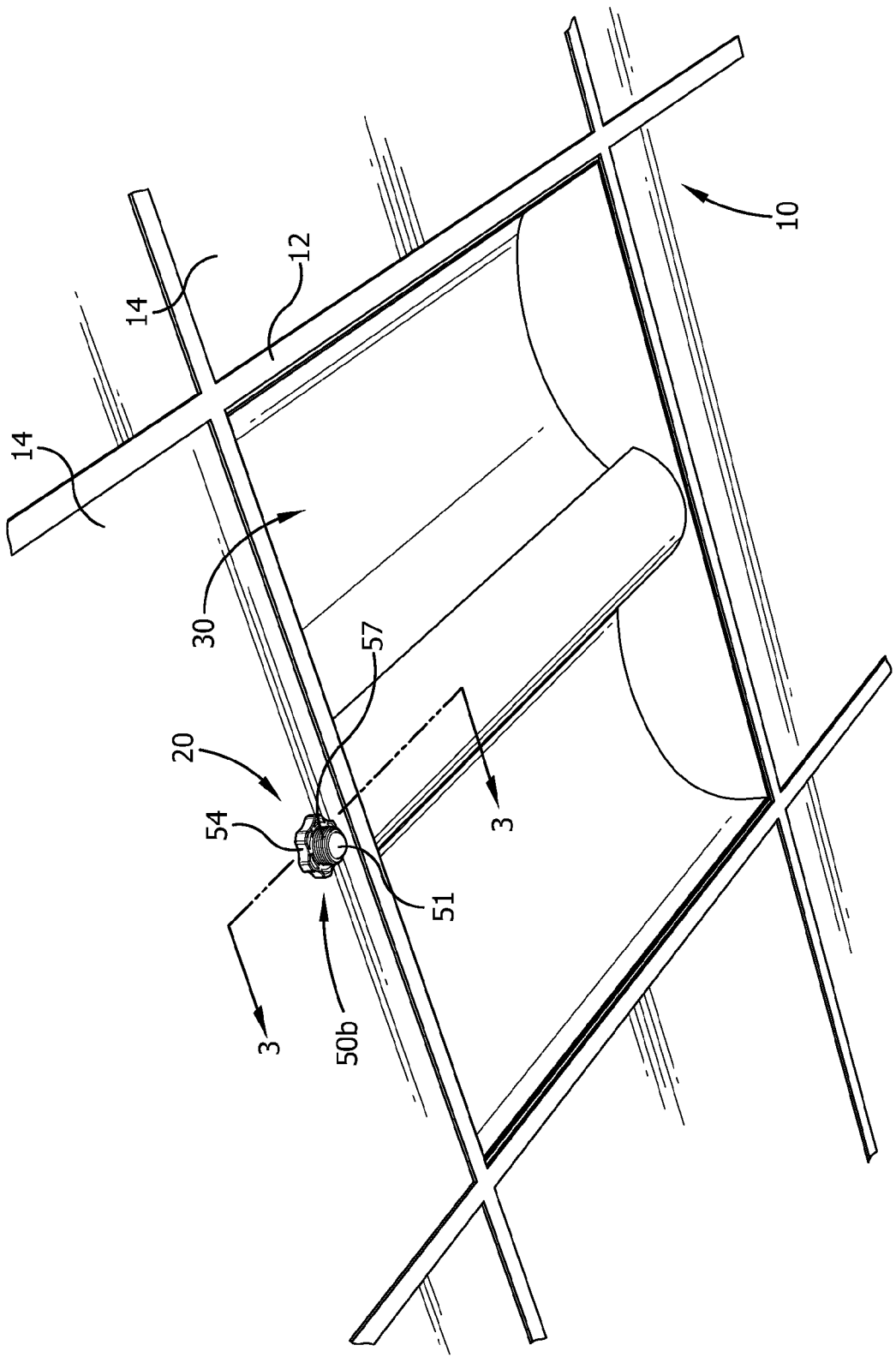
FIG. 1 is a bottom perspective view of the sensor system for a recessed lighting system according to one embodiment.

As shown in FIGS. 1-3, sensor system 20 may incorporate a lens 51 covering sensor 52 in the distal end 50b of flexible tube 50 such that varying environmental characteristics may be measured by control electronics placed on an interior portion of the housing 22. Lens 51 may either control the input characteristics of the environmental condition being measured or magnifying the same characteristics. Sensor 52 affixed to distal end 50b of the tubing 50 may measure a number of different known characteristics and control circuitry and electronics may be placed on an interior of the housing 22 for proper electronic control of the recessed luminaire 30. Such control electronics are well known in the art and may be integrated with sensor 52 and with the sensor control line 16 as is necessary to control the light output of the recessed luminaire 30 depicted. As is shown, tubing 50 connecting the sensor to housing 22 may include low voltage wire 24 connected to a switch and PCB 26 in the housing. The sensor control line 16 may be directly connected to the recessed luminaire control line 31 in order that the sensor system may directly and electronically control the recessed luminaire 30 shown. The sensor control line 16 as well as the troffer or recessed luminaire control line 31 may be resident in the interior of the housing, the respective devices may be pulled out through openings without the necessity of opening either housing such that they may be placed in electronic connectivity.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A sensing system for control of at least one recessed light fixture comprising:
    a sensing system (20) including a housing (22) with a elongated adjustable member (50) having a first end (50a) and a distal end (50b),
    said first end (50a) of said adjustable member (50) is coupled to said housing (22) and said distal end (50b) of said adjustable member (50) includes one or more sensors (52);
    at least one recessed light fixture (30) having a housing (32), said sensing system housing (22) exteriorly coupled to said light fixture housing (32),
    whereby said one or more sensors (52) are in direct communication with said at least one recessed light fixture (30);
    wherein said distal end (50b) of said adjustable member (50) is repositionable relative to said sensing system housing (22) thereby allowing said one or more sensors (52) to be positioned in a variety of spaced locations from said sensing system housing (22); and
    a detachable sensor protector (60), said sensor protector (60) includes a cutting tool (62) for cutting the correct opening for insertion of said distal end sensor (52) into an adjacent surface to which said light fixture housing (32) is recessed during installation of said sensing system (20).

2. The sensing system of claim 1 wherein said distal end (50b) of said adjustable member (50) can be vertically or horizontally repositioned relative to said sensing system housing (22).

3. The sensing system of claim 1 wherein said distal end (50b) of said adjustable member (50) releasably engages an adjacent surface to which said light fixture (30) is recessed.

4. The sensing system of claim 1 wherein said adjustable member (50) is a flexible tube.

5. The sensing system of claim 1 wherein said sensing system housing (22) is releasably connected to said light fixture (30) by a connector (40).

6. A recessed light fixture assembly comprising:
    a recessed side car box (22) externally positioned to and coupled to an external wall of a light fixture housing (32), said side car box (22) including a flexible tube (50) projecting therefrom,
    wherein said tube (50) of said side car box (22) having a first end (50a) and a second end (50b), said first end (50a) of said tube (50) coupled to said side car box (22) and said second end (50b) flexed into a desired installation position spaced from said coupled said side car box (22) and said light fixture housing (32),
    said second end (50b) of said tube (50) further includes a sensor (52);
    wherein said sensor (52) is wired through said flexible tube (50) and is in electrical communication with one or more electrical components (26) of said side car box (22) to control said light fixture housing (32) wherein said second end (50b) of said flexible tube (50) includes a thread lens tube (57) that threadably receives a flange (54) to allow adjustment for attachment through a material from which said light fixture housing (32) is recessed.

7. The recessed light fixture assembly of claim 6 wherein said sensor (52) positioned at said second end (50b) of said tube (50) includes a lens (51).

8. The recessed light fixture assembly of claim 6 wherein said side car box (22) is releasably secured to said external wall of said light fixture housing (32).

9. The recessed light fixture assembly of claim 6 wherein said flexible tube (50) is repositionable from a first undesired position to said desired installation position.

10. The recessed light fixture assembly of claim 9 wherein said tube (50) is repositionable between said first undesired position to said desired installation position without the use of tools.

11. The recessed light fixture assembly of claim 6 wherein said flexible tube (50) is sufficiently rigid to maintain its shape when repositioned in said desired installation position.

12. A light fixture assembly comprising:
    a light fixture (30) having a recessed light fixture housing (32);
    a sensor system (20) having a housing (22) with an external flexible tube (50), a distal free end (50b) of said external flexible tube (50) includes a lens (51) covering a sensor (52), said sensor (52) electrically connected to control electronics (26) in said sensor system housing (22) that is externally coupled to said light fixture housing (32), said sensor (52) of said flexible tube distal free end (50b) is independently locatable separate from said coupled sensor system housing (22) and said light fixture housing (32), said electronics (26) of said sensor system housing (22) control said light fixture (30) upon input from said sensor (52), wherein said distal free end (50b) of said flexible tube (50) includes a threaded lens tube (57) that threadable receives a flange (54) to allow adjustment for attachment through a material from which said light fixture housing (32) is recessed.

13. The light fixture assembly of claim 12 wherein said flexible tube (50) allows said distal free end (50b) with said sensor (52) to be vertically and horizontally adjusted separate from said coupled sensor system housing (22) and said light fixture housing (32).

14. The light fixture assembly of claim 12 wherein said light fixture (30) is a recessed fluorescent light fixture.

15. The light fixture assembly of claim 12 wherein said sensor system housing (22) is releasably connected directly to said light fixture housing (32).

16. The light fixture assembly of claim 12 wherein said sensor (52) is an occupancy sensor.

17. The light fixture assembly of claim 12 further including a detachable sensor protector (60), said sensor protector (60) includes a cutting tool (62) for cutting the correct opening for insertion of said distal free end (50*b*) of said flexible tube (50) into an adjacent surface to which said light fixture housing (32) is recessed during installation of said sensor system (20).

18. The light fixture assembly of claim 17 wherein said detachable sensor protector (60) threadably engages said distal free end (50*b*) of said flexible tube (50) and surrounds said lens (51) prior to installation.

\* \* \* \* \*